United States Patent [19]

DeRoche et al.

[11] Patent Number: 4,529,281
[45] Date of Patent: Jul. 16, 1985

[54] MICROFICHE READER TRANSPORT SYSTEM

[75] Inventors: Terrance P. DeRoche, Duluth; Thomas A. Hollander, Maple Plain; Charles H. Smoot, Minnetonka, all of Minn.

[73] Assignee: MF Reader Development Fund, Duluth, Minn.

[21] Appl. No.: 549,916

[22] Filed: Nov. 9, 1983

Related U.S. Application Data

[63] Continuation of Ser. No. 256,927, Apr. 23, 1981, abandoned.

[51] Int. Cl.³ .............................................. G03B 23/08
[52] U.S. Cl. .................................................. 353/27 A
[58] Field of Search ...................... 353/27 R, 27 A, 25; 33/1 M, 18 R; 354/120, 123; 355/40; 318/571, 575; 364/474

[56] References Cited

U.S. PATENT DOCUMENTS

4,174,891 11/1979 Flint ............................... 353/27 A X
4,254,552 3/1981 Samis ................................ 33/1 M X

*Primary Examiner*—Harry N. Haroian
*Attorney, Agent, or Firm*—Orrin M. Haugen; Thomas J. Nikolai; Douglas L. Tschida

[57] ABSTRACT

A microfiche reader transport system permitting the automatic and selective accessing of one of a plurality of microfilm frames mounted on a microfiche card. The transport system is independently actuable in the X and Y directions via stepper motor means which are, in turn, selectively controlled via an operator keyboard and a programmable microprocessor controller responsive thereto. The transport system further has the capability of accommodating microfiche cards of various frame formats, and includes means for adaptively adjusting to different magnification ratios of the reader optics and for audibly prompting and verifying operator selections and error conditions.

12 Claims, 6 Drawing Figures

MICROFICHE READER TRANSPORT SYSTEM

This is a continuation of application Ser. No. 256,927, filed Apr. 23, 1981, now abandoned.

BACKGROUND OF THE INVENTION

The present invention is related to microfiche transport systems, and in particular a transport system wherein the microfiche may be selectably and independently moved along the X and Y axes so as to automatically position selected frames on the microfiche relative to the lens system.

With the increase in popularity of microfiche storage systems for storing vast amounts of data in relatively small spaces comes the attendant problem of being able to selectively retrieve specific frames of data from individual microfiche. The present invention is generally related to those systems wherein the reduced data contained within the various frames on each microfiche is found in various format sizes. A format typically accommodating data contained on documents that are $8\frac{1}{2} \times 11$ inches or $11 \times 14$ inches and each microfiche being relegated to documents of the same format. Thus, any size document can be reduced to one or more microfiches and numerous documents can be reduced to a relatively small file of microfiches.

Retrieval of the information contained on the individual microfiches, however, presents a problem to the operator of having to identify the desired data and then locate the data upon one or more microfiches. While various cataloging and indexing schemes are well known and provide the operator with the ability to locate and select the desired microfiche from a larger file, it still becomes necessary for the operator to be able to locate the specific data on the selected microfiche. The present invention therefore relates to a system for permitting the operator to automatically locate selected frames on the microfiche relative to the lens system of a microfiche reader.

Prior to the present invention, numerous techniques and combinations of apparatus have been employed for positioning a selected frame on a microfiche relative to the microfiche reader's lens system and/or selecting a specific microfiche from a file containing numerous microfiche. While the former are of particular interest, the latter do provde some insight into the mechanisms most commonly employed. Various prior art systems for selecting desired microfiche and/or frames of a microfiche from a data file can be found with reference to H. H. Balbierer et al, U.S. Pat. No. 3,561,858; Pearson, U.S. Pat. No. 3,704,451; and Nicholson, U.S. Pat. No. 4,043,652. These patents generally and respectively describe systems wherein various frames of data are stored on punch cards, on a microfiche carousel or on a microfilm web. Pearson, however, shows the only mechanism for positioning individual microfiche relative to a platen via the use of analog-type servo motors.

Other systems too can be found in varying complexity for automatically and selectively controlling the positioning of a microfiche along the X and Y axes. Gobel in U.S Pat. No. 3,870,413 teaches a relatively complex rack and pinion ratchet or detent type assembly that is movable along the X and Y axes via flexible cords that are attached to split-phase capacitive reversible motors and slidable frames, one mounted upon the other and each orthogonally movable relative to the other. Another simpler microfiche transport system can be found in Yeda et al, U.S. Pat. No. 3,790,266, which discloses first and second slidable frames that are capable of movement orthogonal to one another via analog servo motors acting through a pulley and wire arrangement coupled thereto. Probably the most pertinent prior art patent known to applicants is the Toriumi et al U.S. Pat. No. 4,033,684 which discloses a microfiche transport system comprised of slidable frames that are capable of movement orthogonal to one another via pulley and wire assemblies coupled to pulse motors which receive their driving pulses from pulse emitter circuits that are coupled to decoding and arithmetic circuits such that control of the movement of the slidable frames to position desired frames on the microfiche relative to the lens system of a microfiche reader is achieved.

While these examples of prior art disclose various combinations of apparatus of varying degrees of complexity, nowhere is a microfiche transport system disclosed having all the features, functional capabilities, and the simplicity of the transport system of the present invention. In accordance with the present invention, orthogonal movement along the X and Y axes via a support member or saddle and the microfiche holder or table is effectuated by means of a lead screw and a pulley and wire system which are independently coupled to first and second stepper motors and which stepper motors are, in turn, coupled to a programmable microprocessor. The prior art fails to teach such a microfiche transport system. Additionally, the system of the present invention provides audible warnings, selective variations of the magnification factor of the lens system, individual adjustment of the magnification of the lens system at discrete levels of magnification and the ability to selectively read microfiche cards having frames of different formats affixed thereto. All these capabilities are combined in a system that is more versatile and less complex from a mechanical standpoint than any known competing product presently being marketed.

It is therefore a principal object of the present invention to provide a microfiche transport system having a pulsed stepper motor rotationally driving a precision lead screw which is arranged to linearly translate a saddle member in small, known, incremental steps relative to a support base.

It is a further object of the present invention to provide a microfiche transport system that is controlled via an operator keyboard and a programmable microprocessor operatively coupled to the keyboard as well as to discrete switches mounted upon the X-Y transport mechanism.

It is a further object of the present invention to provide a microfiche transport system that is adapted to handle microfiche having frames of varying formats.

It is still another object of the present invention to provide a microfiche transport system capable of selectively varying the magnification of its lens system and individually adjusting the magnification of the lens system to accommodate the discrete levels of magnification.

It is a further object of the present invention to provide a microfiche transport system providing for audible warnings to the operator when error conditions are detected in the system.

These objects and others while being accommodated via the present invention will become more clear upon reference to the following description in which like

DESCRIPTION OF THE DRAWINGS

FIG. 4, comprised of FIGS. 4a and 4b, is a schematic diagram of the control circuitry employed with the present apparatus; and FIG. 5 is a flow chart of the program used to control the microprocessor of FIG. 4a.

SUMMARY OF THE INVENTION

The present invention comprises a microfiche transport system for selectively and independently controlling the movement of a microfiche along X and Y axes and for selectively positioning the microfiche card and selected frames thereon with respect to the reader optics of a microfiche reader. The mechanical construction of the transport system comprises a rectangular base or frame member upon which a slidable saddle is mounted, the saddle being movable along the Y axis in response to the rotation of a lead screw which passes through the saddle. The saddle has a microfiche holder or carrier slidably mounted thereon and adaptable to movement along the X axis in response to a pulley and wire system. The lead screw and pulley and wire system are, in turn, responsive to individual stepper motors that are mounted upon the base member and that are appropriately coupled to the lead screw and to the pulley and wire system. Movement of the microfiche holder and saddle along the respective X and Y axes is controlled by stepper motors which receive their energization pulses from a programmed microprocessor which receives input commands from its own memory apparatus as well as from an operator's keyboard.

The operation of the transport system essentially is as follows. Upon powering-up the apparatus, the control circuitry under microprocessor control, produces the required pulses to drive the two stepper motors so as to move the microfiche holder to a home position, proximate a microfiche load station, and then to an index position defined by the particular microfiche format then involved. Specifically, upon the depression of a "Load" button, the control circuitry moves the microfiche holder to the load station. After the insertion of a microfiche card into the microfiche holder and upon the depression of an "Index" button, the microprocessor again causes the microfiche holder to be transported to an index position where the operator may correctively position the saddle and microfiche holder relative to the lens system to correct for any error in the mounting of the frames upon the microfiche card or more commonly with the alignment of the card within the holder. The microprocessor further senses a keyboard switch defining a format of the frames of the microfiche card in use as well as the magnification adjustment settings of the discrete level of magnification selected. The further operation of the transport system is then automatic, the operator merely depressing the desired keyboard switches and the microprocessor issuing the requisite stepping pulses to the stepper motors so as to cause the saddle and microfiche holder (carrier) to be moved in a controllable fashion so as to position a specified frame in proper alignment with the reader optics.

The microfiche transport system has the additional functional capabilities for audibly prompting and signaling an operator relative to valid keyboard inputs and error conditions that might occur in the system during operation. The system also has the ability to ramp-up and ramp-down the pulse width modulated drive pulses that are transmitted to the stepper motors in a fashion that results in the smooth acceleration and deceleration of both saddle and the carrier. Finally, the system has the ability to prevent false signaling of operator initiated selections by delaying the acceptance thereof during a switch debounce period.

DESCRIPTION OF THE PREFERRED EMBODIMENT

The following description of the present invention will first be directed to the construction of the mechanical apparatus, the configuration of the power supply and motor driver circuits and finally to a detailed description of the construction and mode of operation of the control circuitry and its associated stored program.

Figure 1:
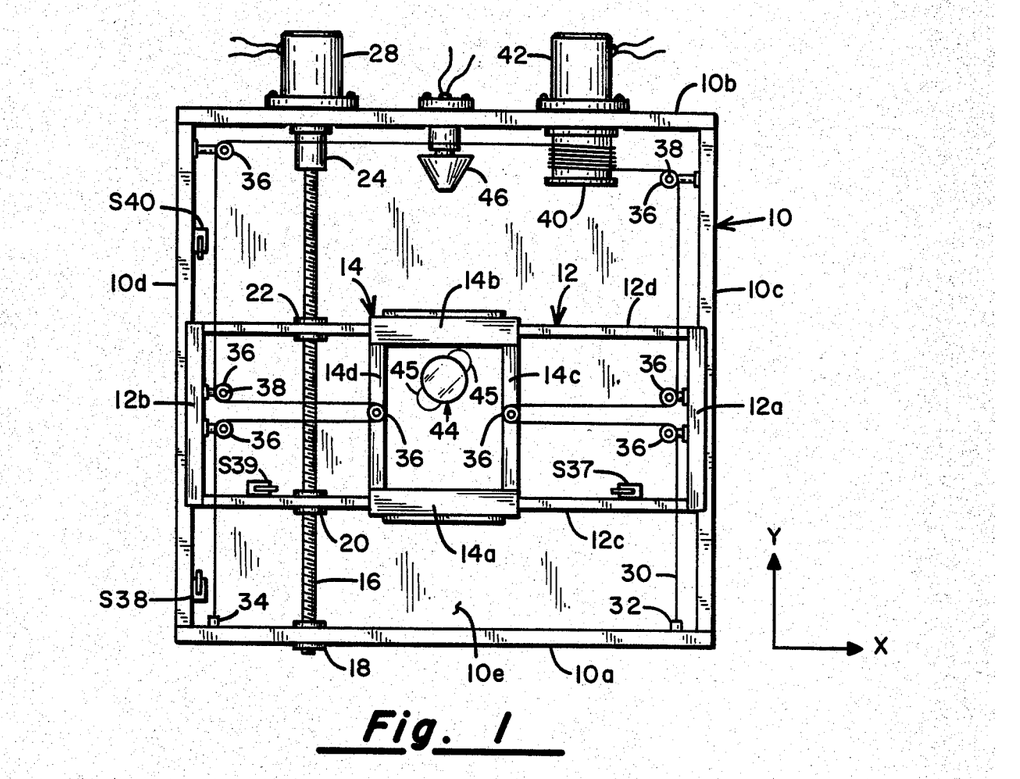
FIG. 1 is a top view showing the essential elements of the present invention.

Referring first to FIG. 1, a plan view is shown of the base assembly with the shroud, screen and optics removed so as to better reveal the construction of the present transport system. Specifically, the base assembly comprises a rectangular frame member 10 having respective front and back panels 10a and 10b and respective right and left side panels 10c and 10d. A rectangular saddle 12 is slidably mounted upon the upper exposed edges of the side panels 10c and 10d via the respective right and left side flanges 12a and 12b of the saddle. The edges of panels 10c and 10d may be lined with a suitable low friction bearing material to facilitate the movement of the saddle 12 thereon. A microfiche holder or carrier 14 is slidably mounted on the saddle 12 via respective front and back plates 14a and 14b which are attached to the microfiche holder 14 and contained within a slot (not shown) routed into the front and back rails 12c and 12d of the saddle 12. The saddle 12 and microfiche holder 14 thus comprise the microfiche carriage assembly and which assembly is independently slidable along the X and Y axes, where the X axis is from right to left and the Y axis is from top to bottom relative to FIG. 1.

The motor force for the X and Y movement is provided by a lead screw drive system and a wire and pulley drive system. The lead screw drive system comprises a lead screw 16 that is contained by a bearing assembly 18 in the front panel 10a, individual threaded guide bushings 20 and 22 are also mounted in the respective front and back rails 12c and 12d of the saddle. The lead screw 16, preferably has threads of a 1° pitch and is designed so that a 1.8° rotation of the screw by the application of a single pulse to the stepper motor 28 causes a 0.005 inch linear motion of the saddle 12. A Lovejoy coupler 24 is used to couple the lead screw 16 to the motor's shaft. The wire and pulley system is comprised of a non-extendable, flexible wire 30 that is anchored to the rail 10a via anchors 32 and 34 after passing over a plurality of rotatable pulleys 36 that are stud mounted via studs 38 to the base 10e of the frame member 10 and the respective right and left side rails 14c and 14d of the microfiche holder 14. The wire 30 further passes over a friction drum 40 that is coupled to a second stepper motor 42. Thus, the respective X and Y axial motion of the microfiche holder 14 and the saddle 12 is controlled by the rotatable motion of the respective wire and pulley system and the lead screw system. The rotatable motion of these two drive systems is further controlled by a suitably programmed microprocessor controller which will be described in greater detail hereinafter.

Attention is now directed to the reader optics or lens system 44 which is shown essentially at the center of the area traversed by the X and Y axial motion of the microfiche holder and with respect to which the individual frames mounted upon each microfiche card are selectively positioned. While not shown, it is to be recognized that the lens system 44 is controllably adjustable so as to provide a plurality of magnification ratios, such as, for example, of 24x, 32x, 42x and 48x by the selection of different lenses. Specifically, the magnification ratios may be adjusted by rotating a turret (not shown), upon which two lenses 45 are mounted, so as to bring one of the lenses into alignment with the turret. The turret, in turn, typically contains two additional lenses (not shown) that can be inserted in the focal plane of the selected lens 45. Depending upon which lenses are selected, the above magnification ratios can be obtained. Also shown is the light source 46 that is affixed to the back panel 10b and which light is reflectively deflected by a mirror assembly (not shown) that is affixed to the base 10e below the reader optics 44 so as to reflect the light through the positioned microfilm frame such that the reader optics will magnify the images contained upon the microfilm frame.

Figure 2:
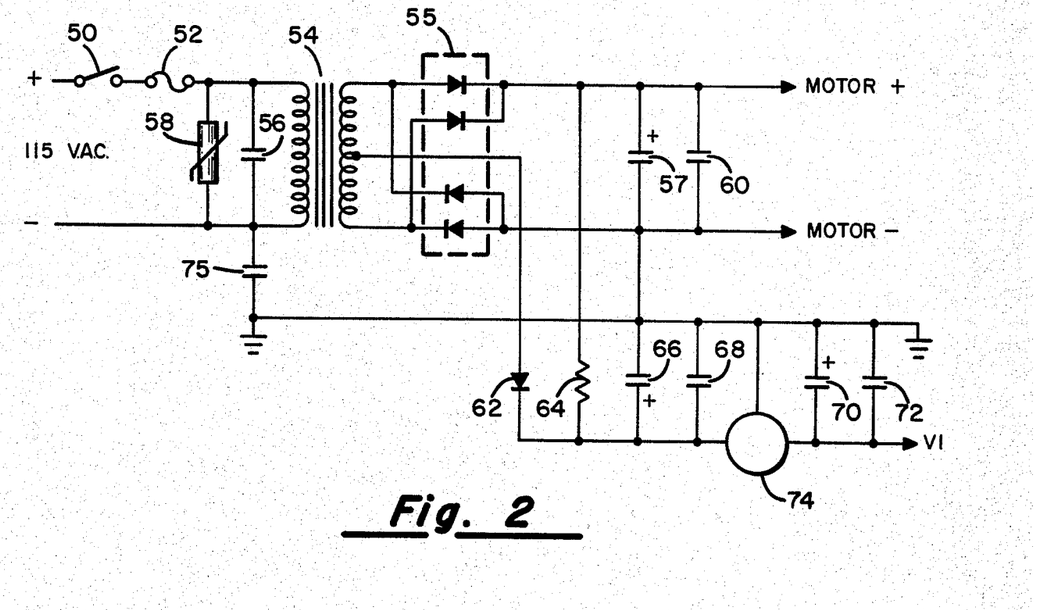
FIG. 2 is a schematic diagram of the power supply employed in the preferred embodiment.

Referring now to FIG. 2, a detailed schematic diagram is shown of the power supply circuitry employed in the present transport system. In particular the power supply is responsive to a nominal 115 volt AC input that is coupled to a power on/off switch 50. Upon the closing of the switch 50, the AC current flows through a dual element fuse 52 and through the primary winding of a shielded transformer 54. The primary winding has a capacitor 56 and transient suppressor 58 coupled in parallel with it. This parallel combination acts to prevent spurious transient signals from affecting the voltage across the primary winding of the transformer 54. The transformer 54 has a turns ratio such that voltages compatible with the lamp 46, the motors 28 and 42 and the logic circuitry of the microprocessor system are obtained.

The center-tapped secondary winding of the transformer 54, upon detecting current in the primary winding, essentially causes the production of a full-wave rectified DC output on the terminal's labeled "motor+" and "motor−" as well as the production of a half-wave rectified logic voltage V1. Relative to the full wave rectified DC signal, the diode bridge 55 first performs a full-wave rectification of the AC input developed across the secondary winding and then filters the full wave rectified signal by means of the filter capacitors 57 and 60 so as to produce a relatively smooth DC voltage level for driving the stepper motors 28 and 42 via the circuitry of FIG. 3.

The half-wave rectified logic voltage, in turn, is produced via one-half of the center tapped secondary winding and the diode-resistor combination of diode 62 and resistor 64. This half-wave rectified signal is then filtered by the filter capacitors 66, 68, 70 and 72. A regulator 74 for the logic circuit supply is connected to the diode 62. The logic ground is coupled to the equipment ground and separated from the primary of the transformer 54 by means of a capacitor 75.

Figure 3:
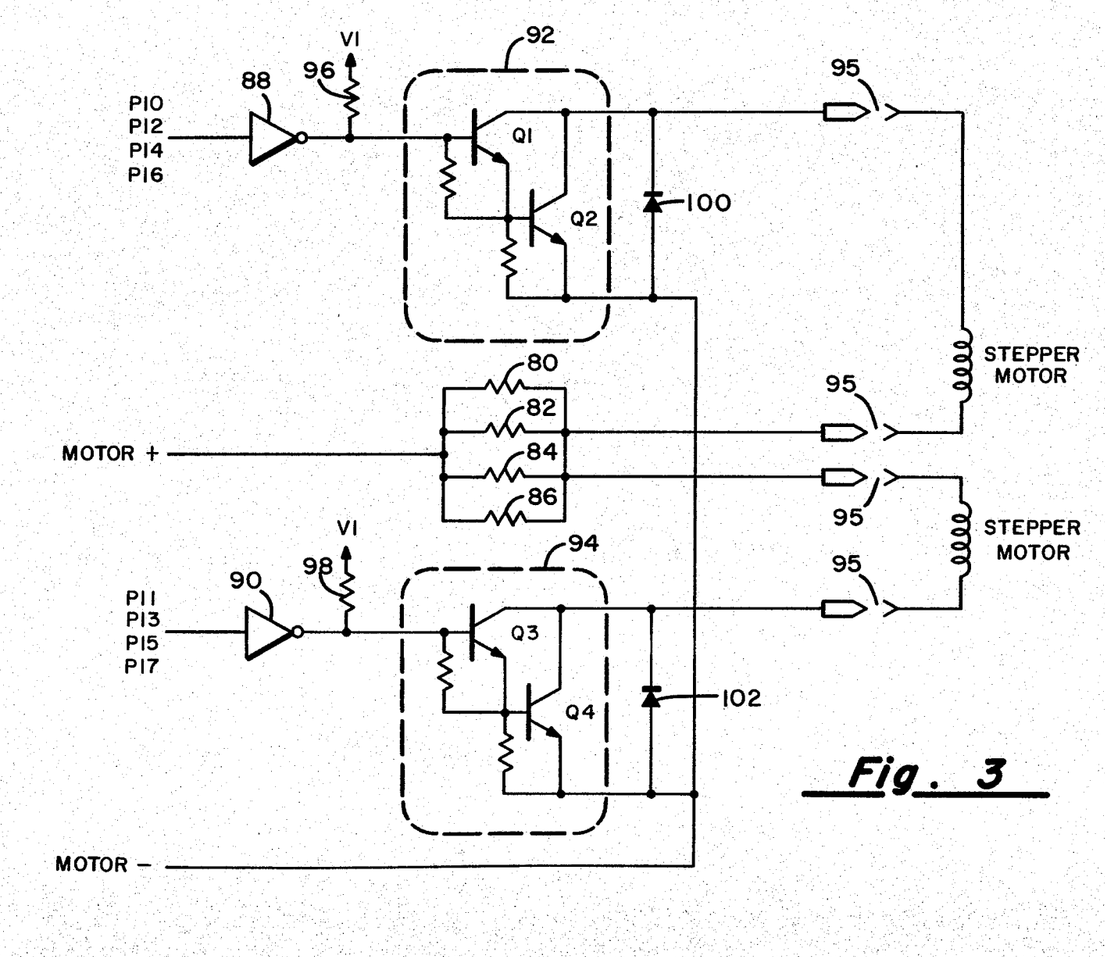
FIG. 3 is a schematic diagram of one of four identical motor drive circuits employed in the present apparatus for pulse driving the stepper motors.

Attention is next directed to FIG. 3, wherein one of four identical motor drive circuits is illustrated. Specifically, two of these motor drive circuits are coupled to the appropriate windings of the stepper motors 28 and 42 so as to cause the stepper motors 28 and 42 to rotate in a forward direction and the other two motor drive circuits are coupled to the windings of the stepper motors 28 and 42 so as to cause the stepper motors to rotate in the reverse direction. Referring now to the details of the motor drive circuits, the "motor+" and "motor−" terminals of the DC power supply of FIG. 2 are coupled to each of the motor driver circuits. In particular, the motor+terminal is coupled to resistors 80, 82, 84 and 86, the resistor bridge typically providing approximately 20 ohms of impedance at 8 watts. It should be noted too late the typical DC voltage level exhibited between the motor+and motor−terminals is approximately a +28 volts at a nominal current of 2.46 amps.

Also coupled to the motor driver circuits are alternative inputs from one of the quasi-bidirectional data buses of the microprocessor and which microprocessor operation will be described hereinafter. For each motor driver circuit the successive microprocessor terminal combinations P10/P11, P12/P13, P14/P15 and P16/P17 are coupled to the respective four motor driver circuits. However, for the sake of the present description it will be assumed that the motor driver circuit coupled to the P10/P11 terminals is being discussed. Therefore, upon receipt of the logic signals from the microprocessor at the transistor transistor logic levels (TTL), these signals are inverted by the respective logic inverters 88 and 90 and cause the input terminals to the respective Darlington-connected power transistors 92 and 94 to alternately be driven high and low, depending upon the binary state of the P10/P11 signals. The alternative pulsing of the Darlington pairs 92 and 94, in turn, causes the voltage across each winding pair of the stepper motors via the brush pairs 95 to be pulsed and provide a predetermined angular rotation, the motion being used to translate the saddle 12 and carrier 14 by the drive system of FIG. 1.

The above-described apparatus, power supply and motor drive circuitry thus essentially act in concert to drive the carriage assembly in response to operator selected coordinates so as to locate the corresponding frames of microfilm relative to the reader optics 44. Once the frame is initially and automatically positioned at the desired coordinates which the operator may find upon reference to a microfiche index, the operator is next able to correctively reposition the frame, if it is not centered, and adjust the gain or focus of the reader optics 44 so as to identify specific detailed data contained on the frame. In this regard, additional functions are provided by the control circuitry to enable the operator to jog the frame approximately 1/16th of a frame. Each jog command is directed to the carriage assembly via selected keys on the operator keyboard that enable the jogging of a positioned frame of microfilm along the X axis to the right or left and along the Y axis, up or down. It is to be recognized too that while the apparatus of the present invention is designed to always position the center of the selected frame relative to the center of the reader optics 44, it may be necessary to jog the frame after its selection, depending upon the adjustment of the apparatus, yet to be described, to accommodate any misalignment of the frame.

Assuming also that the operator may not find the information being sought upon the selected frame, additional advance keys are provided for correctively repositioning the microfiche card by one frame relative to the reader optics 44. In this regard, functional keys are provided for advancing the microfiche card one complete frame along the X axis to the right or left and one frame along the Y axis, up or down. The jog and advance functions are continuously under operator control so as to enable the viewing of selected data and frames that are closely proximate to one another. The selection of additional data not proximate to the first selected frame, merely requires that the operator selectively key-in the coordinates of the next desired frame. Thus, the apparatus essentially operates in an automatic fashion to enable the operator to perform any desired search function relative to any one or set of microfiche cards.

Figure 4A:
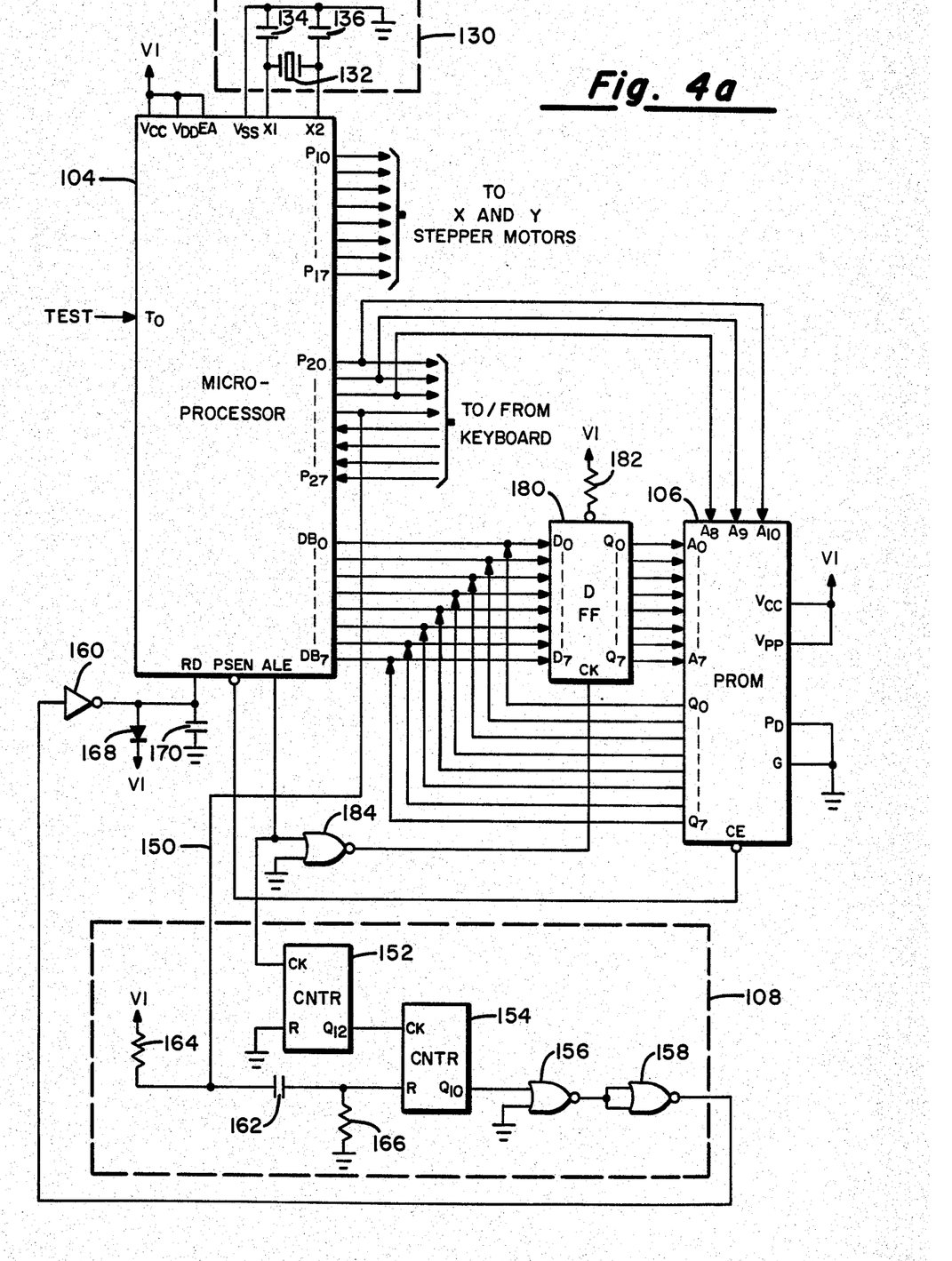
Figure 4B:
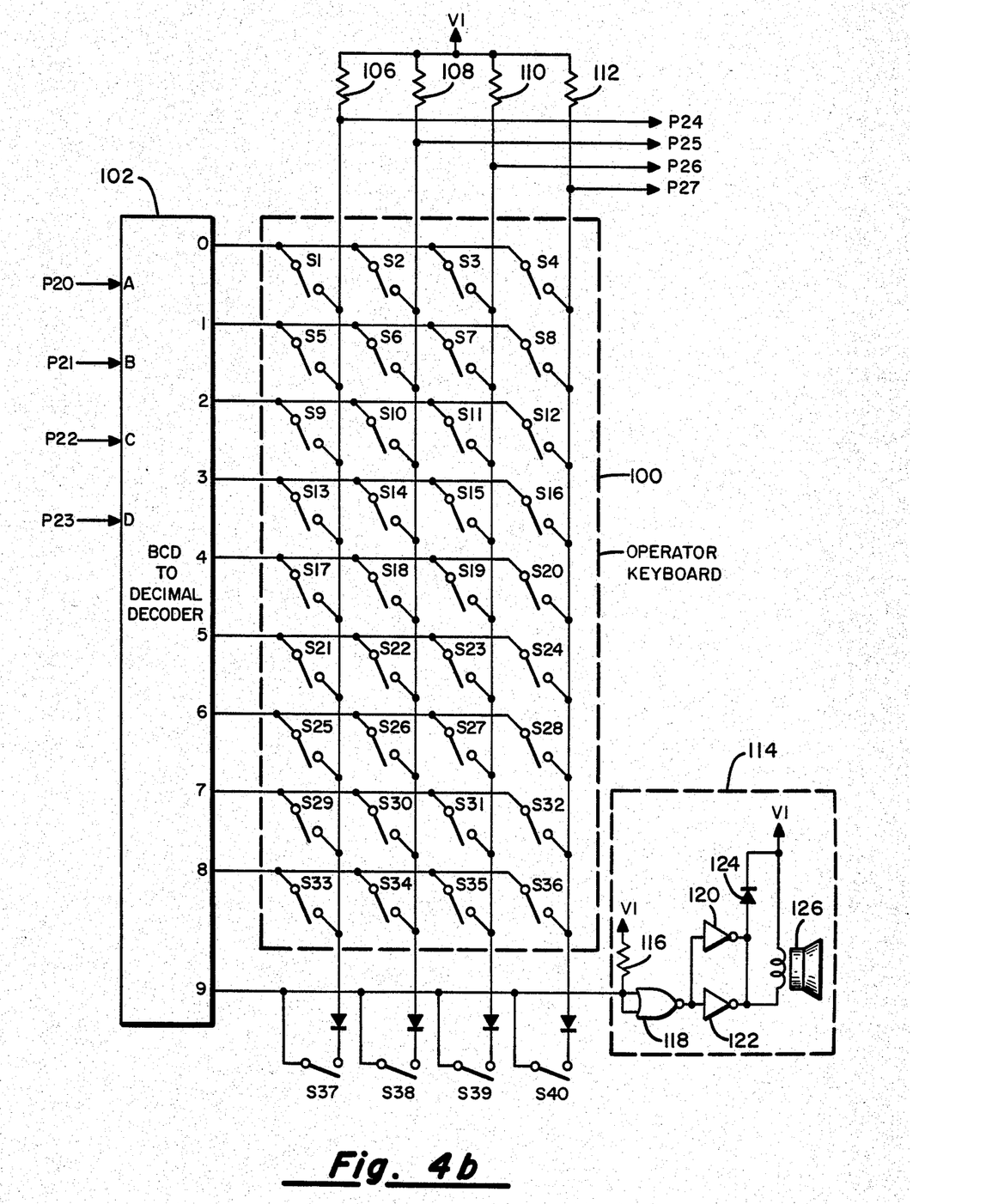

While the present apparatus essentially operates in the above-referenced fashion, particular attention will now be paid to the control circuitry employed with the present apparatus to control the number and duration of the pulses being produced by the individual motor driver circuits referenced in FIG. 3. Attention will also be directed to the various other functional capabilities of the present apparatus as they are enabled by the unique control circuitry employed in the present invention. In this regard, attention is directed to FIG. 4 and which is comprised of FIGS. 4a and 4b. Looking to these figures, the control circuitry is essentially comprised of an operator keyboard 100, a binary coded decimal (BCD) to decimal decoder 102, a microprocessor 104, a programmable read-only memory (PROM) 106 and a "watch-dog" circuit 108. Referring first to FIG. 4b and in particular to the operator keyboard 100, attention is directed to the matrix configuration of the plurality of operator selected switches. Specifically, 32 momentary contact, dual function type switches labeled S1 through S32 have been provided for in the preferred embodiment. Additionally, four permanent type contact switches have been provided and are labeled S33 through S36. These switches are provided to suggest that the system can be easily expanded to meet future requirements. Four additional limit switches, S37 through S40, are also associated with the BCD to decimal decoder 102. These latter switches, however, are not mounted on the operator keyboard 100, but instead, are mounted in pairs on the left frame member rail 10d so as to cooperate with the saddle during its travel and on the front saddle rail 12c to cooperate with the carrier 14 during its travel.

The specific function served by each switch can best be seen with reference to Table I below. Prior to referring thereto, though, it is to be noted that the switches have been generally segmented relative to the major functions being performed. These functions essentially are to identify the coordinate position of each frame relative to a standard coordinate system that has been adopted by the microfiche reader industry. In particular, the first 15 switches, S1 through S16, define the respective rows and columns of the microfilm frames mounted upon each microfiche card. With reference to the switch S1, the legend appearing upon the switch is "A/1" and which implies that upon its first depression the control circuitry will cause the carriage assembly to position the A row of film frames relative to the reader optics. Upon the timing out of the switch debounce period, if this same switch is again depressed, a second function "1" is entered which directs the apparatus to move the carriage assembly to center the frame contained in the first column of the A row relative to the reader optics 44. While this description has been directed to switch S1, it is to be noted that each of the other switches S2 through S15 correspondingly cause the centering of a selected frame of microfilm contained on any microfiche at the respective coordinates defined by these switches, relative to the reader optics 44.

It is to be further noted that depending upon the magnification capabilities of the microfiche reader, microfiche cards containing a greater number of somewhat smaller microfilm frames may be manipulated by the present apparatus. Each frame size, however, must comply with one of two existing industry standard formats (i.e., 8½ × 11 inches or 11 × 14 inches) and only one such format should be present on any one microfiche card. The system of the present invention can be readily reconfigured to accommodate any future standards which may be adopted. With the corresponding variation in frame sizes, however, the operator keyboard 100 may or may not require additional coordinate switches for locating the additional frames that could be present upon the microfiche cards (e.g., a microfiche card that is to be read at a magnification of 48x may contain 16 rows and columns). In particular and referring to Table I below, it is be noted that only a 15×28 matrix is suggested. A switch S16 is, however, included, albeit not being designated at this point in time.

The operator keyboard 100 is further segmented into a group of four "Advance" switches, S17 through S20, that permit the operator, as mentioned, to advance the microfiche card one frame position along either the X or Y axes. The "Jog" switches S22 through S25 are also clustered and permit the operator to jog the apparatus and cause the previously mentioned incremental movement of a selected frame along the X and Y axes approximately 1/16th of a frame. The switches S27 and S28 accommodate the "Index" and "Load" operator commands, and the switches S16, S21, S26, and S29 through S32 have been left open to permit future expansion of the apparatus.

The permanent contact switches S33 through S36, too, have been functionally segregated to provide for magnification, format and test routine functions. The limit switches S37 through S40, while not mounted upon the operator keyboard 100, are also coupled to the switch matrix and provide information to the microprocessor 104 relative to the X and Y "home" position and the maximum possible displacements of X and Y. Specific switch and function information may, however, be further obtained upon reference to the following Table I.

TABLE I

| KEYBOARD SWITCH FUNCTIONS | | | |
| --- | --- | --- | --- |
| "MOMENTARY CONTACT SWITCHES" | | | |
| SWITCH | LEGEND | FIRST FUNCTION | SECOND FUNCTION |
| S1 | A/1 | Row A | Column 1 |
| S2 | B/2 | Row B | Column 2 |
| S3 | C/3 | Row C | Column 3 |
| S4 | D/4 | Row D | Column 4 |
| S5 | E/5 | Row E | Column 5 |
| S6 | F/6 | Row F | Column 6 |
| S7 | G/7 | Row G | Column 7 |
| S8 | H/8 | Row H | Column 8 |
| S9 | I/9 | Row I | Column 9 |
| S10 | J/10 | Row J | Column 10 |
| S11 | K/11 | Row K | Column 11 |
| S12 | L/12 | Row L | Column 12 |
| S13 | M/13 | Row M | Column 13 |

TABLE I-continued

KEYBOARD SWITCH FUNCTIONS

| | | | |
|---|---|---|---|
| S14 | N/14 | Row N | Column 14 |
| S15 | O/15 | Row O | Column 15 |
| S16 | 16 | — | Column 16 |
| S17 | UP/17 | Carriage up 1 frame w/carry | Column 17 |
| S18 | Right/18 | Right 1 frame w/carry | Column 18 |
| S19 | Down/19 | Down 1 frame w/carry | Column 19 |
| S20 | Left/20 | Left 1 frame w/carry | Column 20 |
| S21 | 21 | — | Column 21 |
| S22 | | Jog up 1/16 frame | — |
| S23 | | Jog right 1/16 frame | — |
| S24 | | Jog down 1/16 frame | — |
| S25 | | Jog left 1/16 frame | — |
| S26 | 26 | — | Column 26 |
| S27 | 27 | Index/27 | Column 27 |
| S28 | 28 | Load/28 | Column 28 |
| S29 | | — | — |
| S30 | | — | — |
| S31 | | — | — |
| S32 | | — | — |

"PERMANENT CONTACT SWITCHES"

| | Magnification | | | |
|---|---|---|---|---|
| | 32× | 24× | 42× | 48× |
| S37 | On | Off | On | Off |
| S38 | On | On | Off | Off |

| | FORMAT | |
|---|---|---|
| | Off | On |
| S39 | 8.5" × 11" | 11" × 14" |

| | TEST ROUTINE | |
|---|---|---|
| | Off | On |
| S40 | Special Diagnostic Test | Normal |

| | LIMIT SWITCHES |
|---|---|
| S33 | Home X |
| S34 | Home Y |
| S35 | X Max |
| S36 | Y Max |

Referring now to the electrical interconnections of the operator keyboard 100, each of its nine rows of switches is coupled to a respective one of the output terminals 0 through 9 of the BCD to decimal decoder 102. In general, though, the A, B, C and D input terminals of the decoder 102 are coupled to 4-bits of BCD data that are received from terminals P20, P21, P22 and P23 of the microprocessor 104. These bits of BCD data are used during a key scan operation to sequentially ground one side of the switches S1 through S16, one row at a time, via the first four output terminals of the decoder 102; such that upon the depression of one of these respective switches, a low TTL logic signal is transmitted over the corresponding column line to one of the input terminals P24, P25, P26 or P27 of the microprocessor 104. It is to be recognized though that at the same time, the other three column lines will each be at a high TTL logic level so that in essence a 4-bit binary signal will be transmitted to the microprocessor, where the signal will be sensed, interpreted and used to cause appropriate signals to be transmitted via the output terminals P10 through P17 thereof to the X and Y stepper motors. It is also to be noted that the terminals 5 through 8 of the decoder 102 and the corresponding rows of switches S21 through S36 are also scanned in a similar manner to the described above.

Further attention is directed to the audible warning circuit 114 of FIG. 4b and which circuit is coupled to each of the columns of the operator keyboard 100 via the respective limit switches S37 through S40 and to the decoder 102 via terminal 9. In particular, the audible warning circuit 114 is comprised of a voltage source, V1, that is coupled via a resistor 116 to a NOR gate 118. The NOR gate, in turn, is coupled to parallel inverters 120 and 122 which, in turn, are coupled to the anode of a diode 124. The diode 124 is next coupled in parallel with the drive coil of the speaker 126 and which parallel combination is biased by the voltage source V1. Thus, the operation of the audible warning circuitry 114 is dependent upon receiving a signal from the microprocessor 104 via the terminal 9 of decoder 102 so as to forward bias the diode 124 and cause the speaker 126 to emit an audible sound. In this regard, it should be noted that the audible warning circuitry 114 is selectively capable of 100 msec audible warnings at a frequency of either 4 kilohertz or 2 kilohertz or of emitting a 600 msec warble-like audible signal that is comprised of alternate 4 kilohertz and 2 kilohertz sounds. The specific conditions for initiating the audible warning circuitry 114, however, will be described in greater detail hereinafter.

It should also be noted that terminal 9 of decoder 102 is typically at a high logic level, except when driven low to cause the audible warning circuitry 114 to operate. Consequently, if at any time a limit switch is activated, a corresponding low logic signal will be transmitted to the microprocessor 104. The microprocessor 104 will then react to the signal, except if an "Index" function or power-up is occurring, and cause the carriage assembly to stop.

Upon operator initiation of a specific command and the detection thereof by the microprocessor 104 on the terminals P24 through P27, the microprocessor 104 responds and causes the appropriate action to take place. Specifically, the microprocessor responds according to the dictates of the program that is stored in the programmable read only memory (PROM) 106. The flow chart of this program can be seen with reference to FIG. 5. The description of the program, however, will be set forth in greater detail hereinafter, and the present description will only be directed to the circuitry peripheral to the microprocessor 104.

The microprocessor 104 employed in the preferred embodiment is an Intel Corportion 8-bit microcomputer, Model No. 8035L. While only those terminals shown in FIG. 4a and the general operation of the microprocessor 104, as it pertains to the present apparatus, will be discussed, if additional information is desired, such information may be found upon reference to an appropriate Intel user reference manual.

Coupled to the microprocessor 104 at its $V_{ss}$, X1 and X2 terminals is a 6 megahertz oscillator that is used to provide the basic clock frequency within the microprocessor 104. In particular, the oscillator 130 is comprised of a crystal 132 and parallel capacitors 134 and 136 coupled to either side of the crystal 132 and isolating the crystal output from the ground potential $V_{ss}$.

Also coupled to the microprocessor 104 at its $T_0$ terminal is a test input. This terminal, however, is only active when switch S35 is "on" and at which time an operator can insert a test microfiche and sequence of pulses that will be described in greater detail hereinafter.

Also coupled to the P23 terminal, via line 150, is the watch-dog circuit 108. The watch-dog circuit essentially operates to perform a time-out interrupt if an unduly long period of time has elapsed between operator initated commands or if the microprocessor gets "lost". In particular the watch-dog circuit is comprised of two 12-stage ripple carry binary counters 152 and 154 that are coupled such that the carry from the twelfth stage of the counter 152 is coupled to the clock input of the counter 154 and with the output from the tenth stage of the counter 154 being coupled to a NOR gate 156. The counters 152 and 154 are initiated upon the clocking of an address latch enable signal on the ALE terminal of the microprocessor 104. Specifically, the counter 152 advances upon each such ALE clock signal, which event occurs once during each cycle of the microprocessor 104, until a carry ripples through the counters 152 and 154 to the $Q_{10}$ stage of the counter 154, where it then drives NOR gate 156, NOR gate 158 (configured as an inverter) and inverter 160 until it causes an appropriate logic signal to be produced on the RD terminal of the microprocessor 4. If the counter 154 were not reset, due to a failure of a signal (i.e., a logic low) from terminal P23 on Line 50, the capacitor 162 would not discharge and cause the resetting of the counter 154. Rather the voltage source V1, via resistors 164 and 166 and capacitor 162, would cause the counter 154 to remain set and thus produce a signal upon the count reaching the tenth stage. The logic high occurring at the tenth stage would eventually appear as a logic low on the output of inverter 160 and cause the change of the logic level on the $\overline{RESET}$ terminal of the microprocessor 104. Typically the $\overline{RESET}$ terminal is at a high logic level due to the voltage source V1, the diode 168 and the capacitor 170. The change in state of the logic level on the $\overline{RESET}$ terminal would thus be detected and interpreted by the microprocessor 4 so as to disable the then-occurring function and cause the return of the carriage assembly to the "Index" position.

Also coupled to the microprocessor 4 via the 8-bit bidirectional data bus, comprised of terminals $DB_0$ through $DB_7$, and terminals P20 through P23 is the PROM 106. Intermediate thereto, however, is a D-type flip-flop 180 that is additionally clocked via the ALE signal and NOR gate 184 to cause address information to be impressed from the microprocessor 104 on the PROM 106 and the data resident at the address locations to be transmitted via the PROM's output terminals $Q_0$ through $Q_7$ to the same microprocessor terminals $DB_0$ through $DB_7$, but during different clock periods of the full duplexed operation of this I/O port. The microprocessor is thus able to access the program contained in the PROM 106, as necessary, during its control of the present apparatus.

Figure 5:
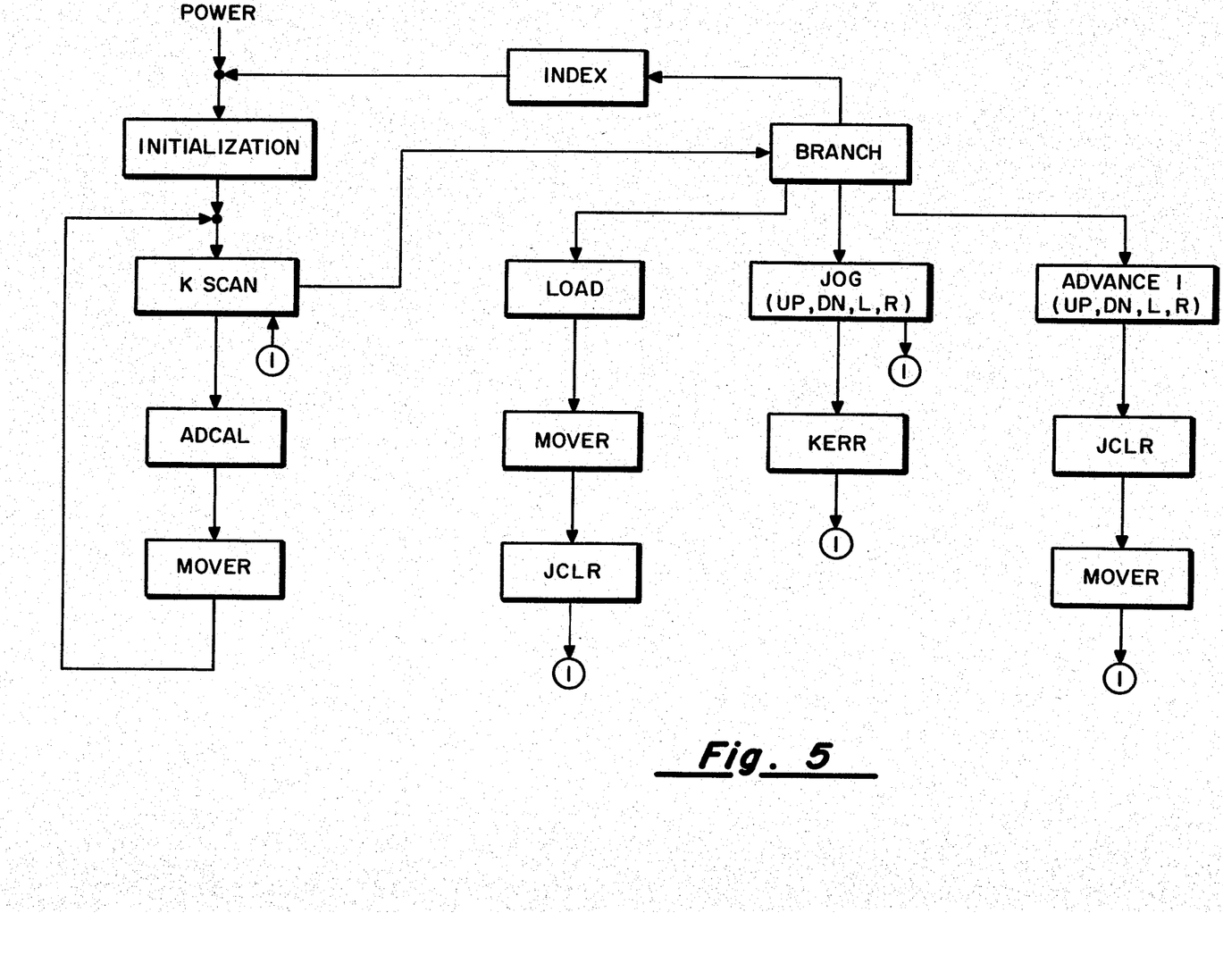

Referring now to FIG. 5, a description of the operation of the above apparatus and circuitry will be set forth as dictated by the execution of the routines and sub-routines of FIG. 5 and the data base contained within the random access memory (RAM) that, in turn, is contained within the microprocessor 104. Attention is first, however, directed to the data base of Table II that is partially loaded in the RAM upon power-up, and wherein the various hexadecimal address values of the microprocessor RAM are shown relative to their contents. In turn, Table III shows the various routines and sub-routines of the program that are utilized by the microprocessor 104, as well as a description of the primary functions being performed by each. Those skilled in the art will be readily able to develop detailed machine language program coding from the information provided herein and, hence, it is deemed unnecessary to set forth the program listings herein.

TABLE II

MICROPROCESSOR RAM ADDRESSES
(Hexidecimal)

| ADDRESS | CONTENTS |
|---|---|
| 0 | |
| 1 | |
| 2 | |
| 3 | |
| 4 | |
| 5 | |
| . | |
| . | |
| 20 | Status |
| 21 | Flags |
| 22 | L Cnt. |
| 23 | R Cnt. |
| 24 | U Cnt. |
| 25 | D Cnt. |
| . | |
| 27 | Temp 3 |
| 28 | Temp 1; Y Tokin |
| 29 | Temp 2; X Tokin |
| . | |
| 2C | Y Max |
| 2D | X Max |
| 2E | Y Inc. |
| 2F | X Inc. |
| 30 | H; Y Index |
| 31 | l; Y Index |
| 32 | H; X Index |
| 33 | L; X Index |
| 34 | H; Y Move Cnt. |
| 35 | L; Y Move Cnt. |
| 36 | H; X Move Cnt. |
| 37 | L; X Move Cnt. |
| . | |
| 3A | Y Table Base |
| 3B | Y Table Base |
| 3C | H; Current Y |
| 3D | L; Current Y |
| 3E | H; Current X |
| 3F | L; Current X | wherein H = a format of 11 × 14
wherein L = a format of 8½ × 11

TABLE III

MICRO-PROGRAM ROUTINES AND SUB-ROUTINES

Function

| Routine Name | |
|---|---|
| INITIALIZATION | Read magnification and format setting; initialize RAM data base; provide power-up sequence; perform initial locating and positioning of the carriage at format index position |
| K SCAN | Read and tokinize keyboard inputs; perform 40 MSEC key debounce; check for acceptable entries and current microfiche format; initiate key error (K err) sub-routine in case of inappropriate entries; initiate Branch routine; call address calculation (ADCAL) routine; call stepper motor output (MOVER) |
| BRANCH | Causes the branching to special function routines. |
| JOG | Adjusts carriage 1/16th frame or 0.005 inches in appropriate direction. |
| Jog Up | |
| Jog Down | |
| Jog Left | |
| Jog Right | |
| ADVANCE Up 1 Down 1 Left 1 Right 1 | Advances carriage 1 frame in the appropriate direction including carry if last frame. |

TABLE III-continued
MICRO-PROGRAM ROUTINES AND SUB-ROUTINES

| | Function |
|---|---|
| INDEX | Moves carriage to index position. |
| LOAD | Moves carriage to the microfiche load position. |
| Sub-Routine Name | |
| TEST | Performs an equipment diagnostic test. |
| JCLR | Clears jog counters. |
| DECY | Decrements Y tokin. |
| INCY | Increments Y tokin. |
| DECX | Decrements X tokin. |
| INCX | Increments X tokin. |
| DADD | 16-bit addition routine. |
| DSUB | 16-bit subtraction. |
| DSUBZ | 16-bit subtraction (alternate forum). |
| BPH | Beep high tone, 4 KHz, 100 MSEC. |
| BPL | Beep low tone, 2 KHz, 100 MSEC. |
| SCAN | Do one keyboard scan. |
| DLAY 40 | Wait 40 MSEC (debounce). |
| SWER | Limit switch detector. |
| ADCAL | Translates tokins to move count. |
| MOVER | Output stepper routine. |
| KERR | If: 1. illegal keyboard sequence; 2. temporary loss of power; or 3. start up of reader Then: a. current action is aborted; b. audible error (warble) is signaled for 400 m.s.; c. carriage proceeds to "Index" position; d. high tone is sounded for 100 m.s.; and e. unit is ready to accept commands. |

Beginning now with a time sequenced description of the microprogram of FIG. 5, upon power-up via the closing of switch 50, the apparatus is reset and the initialization routine INIT is called up. Prior thereto, though, it is encumbent upon the operator to select the proper format by setting switch S35 and to select the appropriate one of the four magnification factors by adjusting the desired lens into the focal plane and which action causes the setting of the switches S33 and S34 to the specific combination corresponding to the selected magnification. It is to be noted that the magnification factor is detected by the microprocessor 104 via the binary code that is established upon the setting of one of the possible combinations of the two switches S33 and S34, wherein the on and off positions are merely representative of binary ones and zeros. Upon entering its initialization routine, the microprocessor 104 first reads the magnification and format settings of the switches S33, S34 and S35, and depending upon the binary values that are detected, it generates an appropriate RAM data base pursuant to Table II.

It is to be noted that the various possible data bases have been programmed into the PROM 106, and thus merely require the microprocessor to read the data into its internal RAM. Each data base further having been scaled to the various frame sizes that could be encountered and in particular to the X, Y centers of these frames. It is also to be noted that correction tables are contained within the PROM 106 to permit the adjustment of the apparatus to the peculiar X and Y axes of each format.

During this initialization process, the microprocessor also sets the parameters of the motor movement routine MOVER so that it will move, unless otherwise indicated, to one or more limit switches. Specifically, appropriate stepper motor pulses are first produced so as to move the carriage assembly to the "home" position and which is defined to be that position wherein the carriage assembly causes the actuation of the home X and home Y limit switches S37 and S38. Referring to FIG. 1, this corresponds to the upper left corner thereof. The positioning of the carriage assembly at the "home" position also establishes a defined reference relative to the reader optics 44 so that the microprocessor 104 can calculate how far the carriage has to move to get to the center of the index position for the format that has been selected. It can do this since it knows "home" and the index center, so that it is merely a matter of accessing the address calculation, ADCAL, subroutine, determining the relative differences in X and Y and producing the requisite number of pulses via MOVER to cause the stepper motors 28 and 42 to move the carriage assembly to the index position. While the cardboards for containing the frames of microfilm are manufactured to strict industry standards, the frames may be slightly misaligned during the assembly of the microfiche card and, therefore, it may be necessary to adjust the center of each frame relative to the reader optics 44, but which operation will be described in more detail hereinafter. Thus, during initialization, the carriage assembly is first moved to "home" and then to the "index" position for the selected format. As a consequence, the current X and Y address registers of the microprocessor 104 are set at their absolute zero addresses (i.e., X=0, Y=0).

Upon the establishment of the zero absolute address, the initialization routine is complete. The microprocessor next calls up its key scan (K SCAN) routine and begins to interrogate the operator keyboard 100 to determine which, if any, of the various switches have been selected. In particular, the microprocessor 104 sequentially interrogates each row of switches of the matrix-like keyboard 100. An interrogation signal is transmitted, via the P20 through P23 terminals, to the BCD-to-decimal decoder 102, where the signals are decoded and used to selectively drive the output terminals in a sequential fashion. If a switch has been depressed, the condition is detected and transmitted back to the terminals P24 through P27 and a corresponding tokin value is stored in a tokin register of the microprocessor 104. The K SCAN routine, however, will continue to scan the remainder of the keys until it has scanned all 28 keys of the preferred embodiment. It should be noted too that the tokin value stored in the tokin register corresponds to the value of the key that was depressed and which value will be stored as a hexidecimal number (e.g., key 15 would have a tokin of FH, where H indicates the hexidecimal number system). The K SCAN routine, upon reaching the last key, then jumps to a debounce sub-routine which introduces a 40 millisecond delay before reversing itself and re-scanning each of the keys from key 28 back to key 1 via a reverse table look-up operation. During the reverse scan, the K SCAN routine again looks for the first tokin and stores its value in another tokin register and compares the second value with the first value to see if they are the same. If the tokin values are identical, the microprocessor 104 checks to see if the values are within the defined bounds of movement of the carriage assembly and initiates an audible confirmation signal. The audible confirmation occurring as a result of the accessing of the beep low tone (BPL) sub-routine which causes an appropriate binary signal to be transmitted to the audible warning circuitry 114 to cause a 2 kilohertz, 100 millisecond sound. If, however, a different tokin were accessed during the re-scan, a warble sub-routine would be accessed and cause the alternate accessing of the BPL sub-routine as well as a beep high tone (BPH) sub-routine so that the audible warning circuitry 114 would alternate between a 2 kilohertz, 100 millisecond low tone and a 4 kilohertz, 100 millisecond high tone for 600 milliseconds. Upon sounding the warble warning to the operator, the K SCAN routine would then return to its first scan and restart.

Assuming, however, that during the first pass a valid tokin was accepted, the K SCAN routine begins to perform a second scan, just as it did the first scan, to determine the second tokin value. Upon obtaining two valid tokin entries which are stored at the RAM addresses 28 and 29, the program jumps to its address calculation, ADCAL, routine.

As mentioned before, during the ADCAL routine, the microprocessor is seeking to determine the absolute differences along the X and Y axes relative to the current position and the desired target position. Further, the ADCAL routine seeks to determine the directions in which the saddle 12 and microfiche holder 14 are to be directed. It does this by looking to the sign bit upon correcting the tokin values for the current position and desired position and using the sign bit to cause the appropriate values to be loaded into the direction flag registers. Thus, the ADCAL routine determines specific absolute magnitudes by which the carriage assembly is to be moved as well as flags for indicating which directions the saddle and microfiche holder are to move.

Upon completing the ADCAL routine, the program jumps to its MOVER routine. The MOVER routine essentially acts to convert the absolute magnitudes determined by ADCAL into an appropriate set of instructions for causing a relatively smooth acceleration and deceleration of each of the stepper motors 28 and 42, so that the saddle and microfiche holder will move smoothly to the operator selected coordinates of the desired frame of microfilm. While the MOVER routine has many sub-routines, it generally acts to cause a ramping up and ramping down effect via appropriate pulse trains that are transmitted from the P10 through P17 terminals of the microprocessor 104 to the intermediate interface circuits of FIG. 3 and the appropriate windings of the stepper motors. Specifically, the MOVER routine looks to the magnitudes of X and Y that the carriage assembly is to be moved. It then selects an appropriate combination of sub-routines to produce an appropriate pulse train for each of the axes and which sub-routines also consider the various torque/friction characteristics of the stepper motors. In moving the saddle 12 and microfiche holder 14, the MOVER routine initiates a synchronous acceleration of the saddle 12 and microfiche holder 14, until the first one of the saddle 12 and/or microfiche holder 14 is approximately 16 steps away from the desired destination position. At this point in time, the MOVER rotuine permits the saddle 12 or microfiche holder 14 to independently decelerate, while the other assembly continues to accelerate, until the desired position has been reached for that assembly. Thus, it is possible that the saddle 12 may have to move a relatively large distance as opposed to the distance which the microfiche holder 14 is to be moved. Therefore, while the microfiche holder 14 and saddle 12 may initially accelerate synchonously for some period of time, they will eventually decelerate independently, until each has stopped at the selected coordinates and frame of microfilm.

Each pulse produced by the MOVER routine causes the stepper motors 28 and 42 to produce a linear motion of approximately 0.005 inches. It is to be recognized, though, that the actual pulse width will be dependent upon the inertia of the individual stepper motor and its corresponding assembly during the acceleration and deceleration process. In this regard, the pulse width will be modulated per an algorithm of $1/X$, where X is the starting pulse width. Specifically, the pulse width will be modulated in a table look-up fashion, with acceleration being controlled by moving forward in the table and deceleration being controlled by moving backwards in the table. Thus, for acceleration, the active time of each pulse will sequentially decrease as the pulse train is produced, and during deceleration the active time of each pulse will increase so as to brake the stepper motors. It is to be recognized, however, that while a single pulse table is used in the preferred embodiment, separate tables can just as well be used for controlling the motion along the X and Y axes independent of each other.

While the pulses produced by the MOVER routine will have similarity, the actual sub-routine paths taken within the MOVER routine will differ depending upon the distance that each portion of the carriage assembly is to be moved, this distance being indicated by the count values in the respective X and Y MOVER registers. Thus, depending on the value of an individual MOVER count, the MOVER routine will access different sub-routines and cause the corresponding movement as well as the acceleration or deceleration relative to the initial value. It is to be noted, though, that the MOVER registers are decremented at a 0.7 millisecond rate. The time width of each pulse, however, is established to be 0.35 milliseconds, and this period corresponds to the rate at which the MOVER sub-routines operate. The state or the active time of each pulse width is thus estabished twice by each MOVER sub-routine within any 0.7 millisecond period. The state, however, only changing after the second cycling (i.e., the next step of the motor).

During acceleration and deceleration, there are, however, times when the output of a MOVER sub-routine (i.e., the pulse width) does not have to change from one pulse to the next; for example, at the midpoint of the acceleration time for a given move. For these instances, the sub-routines of the MOVER routine also contain so-called "mumble" periods so that, while the state remains the same between successive pulses, the MOVER sub-routine merely idles (mumbles to itself) while the same pulse as the preceding pulse is produced. The MOVER routine is thus able, via its sub-routines, to produce a pulse train which best accommodates the distance to be moved, in the least amount of time. It is to be recognized too that depending upon the flags contained within the direction registers of the microprocessor 104, the pulse trains will alternately be impressed on the appropriate forward and reverse stepper motor windings to cause the stepper motors 28 and 42 to accelerate in the desired direction and then decelerate, the deceleration being effected by pulsing the stepper motors in the reverse direction.

Upon completing the MOVER rotuine and having moved the carriage assembly to the operator selected coordinates, the program returns to its K SCAN routine to see if the operator desires further action. This action may correspond to the operator commanding a "Load", "Index", "Jog" or "Advance" via the corresponding activation of the switches S28, S27, S22–S25, or S17–S20.

Assuming that the operator has commanded a Load, the microprocessor reverts to its branch routine and jumps to the corresponding "Load" sub-routine. During the "Load" sub-routine, the Y registers of the MOVER sub-routine are loaded with a value in excess of the possible motion along the Y axis towards the front plate 10a of the frame member 10. The stepper motor 28 is then pulsed and the saddle 12 moves until it encounters the home X limit switch S37. The saddle then stops immediately or within one or two pulses of the actuation of the limit switch S37. It is to be recognized though that the actual stop point is controlled by the designer. While the microfiche holder 14 may be positioned anywhere along the saddle 12, since no motion along the X axis has occurred, it will always be immediately adjacent the front plate 10a. In this position, the operator may thus load a desired microfiche card into the microfiche holder 14. Movement of the holder 14 to the load position also automatically causes the glass retainer (not shown) that is affixed to the carriage assembly and that is used to contain the microfiche card, to raise and permit the operator to insert the desired microfiche card. The operator should, at this time, if not already done, also select the appropriate reader optics magnification setting by adjusting the lens system—recognizing that this also adjusts switches S33 and S34—and the proper format by setting switch S37. Upon reaching the load position, the jog clear (J CLR) sub-routine is also initiated and the jog counters (i.e., 8-bit shift registers) of the microprocessors 104 are cleared and the program returns to its K SCAN routine.

Assuming that the operator next selects the "index" sub-routine, and which would generally be the case, the Index sub-routine would cause the selection and repeating of the initialization routine. Specifically, the carriage assembly would be moved from the load position to the home position, while on the way passing the index position. This movement again causing the appropriate true address to be established in the current address counters for the specific format selected. Upon fixing the true address, the carriage assembly would next move to the Index position and cause the index frame of the selected microfiche card to be centered relative to the lens system of the reader optics, thus establishing the absolute zero address.

While in most cases the indexing of a microfiche card will cause the centering of the lens system relative to the index position, this condition will depend upon the accuracy with which the microfiche card was assembled. Specifically, the frames of microfilm may be slightly misaligned relative to one another. Any error, however, should be minimal and typically will be constant over the entire microfiche card. The operator, upon detection of this condition, however, may jog the carriage assembly so as to re-position and center the index frame relative to the lens system 44. This is achieved via the actuation of the jog switches S22 through S25. Depending upon the direction of misalignment, the operator may jog either up, down, right or left 1/16th of a frame—the magnitude of jog movement being dependent upon the format selected—with each depression of a jog key. Typically, though, the jog keys are only used during the centering of the index frame, since any misalignment should be uniform over the microfiche card. Thus, by jogging the index frame so as to center it relative to the lens system 44, the operator effectively ensures that all other frames will also be centered upon the subsequent selection of any other frame on the microfiche card. It should be noted that during the jog operation, the current position register of the microprocessor 104 is disabled so that the current position will not be affected by the jogging and that the center of the index frame will correspond to the position in the current address registers. It should also be noted that the actual jogging of any one jog function can only be performed eight times, since the microprocessor performs the jog functions in a truncated fashion while keeping track of the jog activity via four, 8-bit shift registers. As such, upon the ninth depression of one selected jog function the operator will experience an audible "warble" warning and the microprocessor 104 returns to the key scan routine without moving the carriage. Thus, the operator will have to restart and re-select the index function, thus repeating the above operations. It should be further noted that the limiting of the functionality of the jog keys is desirable since all data on any one frame will typically be displayed upon calling of that frame and it should therefore not be necessary for the operator to attempt to look at any one specific portion thereof.

If, however, the operator were to initiate any one jog function more than eight times, the action is ignored and a warble error signal is sounded and it is ready to accept new commands. Other types of possible errors are also accommodated by the KERR sub-routine. For example, any of the improper keyboard sequences or the occurrence of any temporary loss of power, or a power-up condition or the changing of either the magnification or format switches will result in the generation of the warble tone.

Once the operator has centered the index frame relative to the reader optics 44 and assuming that a desired frame has been selected by indicating the corrdinates thereof, the operator has the additional ability to advance the carriage assembly one frame, upon command. The advancement of the carriage assembly by one frame is initiated by the depression of any of the "advance" keys and which initiates the "Advance" sub-routine. The operator may thus also advance frames, like parts of frames during jogs, in the up, down, right or left directions. Further, upon directing the advancement of the carriage assembly beyond either the present column or row, the Advance sub-routine also contains carry provisions for comparing the value in the move counters to the maximum X and Y values contained in the microprocessor's RAM, and for appropriately incrementing or decrementing the MOVER count registers so that the advanced frame will be the next frame relative to the direction indicated.

This carry function is accomplished via the sub-routines "Dec X", "Dec Y", "Inc. Y" and Inc. X", and which cause the apropriate decrementing or incrementing of the X and Y tokins. The ADCAL sub-routine then compares the desired tokin value to the maximum X and Y values in the microprocessor RAM, and if one of these values is exceeded the advance sub-routine causes the register containing the desired tokin to be set to zero and at the same time sets a carry flag so that the appropriate functional advance sub-routine (i.e., up, down, right, left) can instead cause the tokin value to be stored in the other appropriate tokin register. Because each frame of a microfiche card is laid out from left to right and top to bottom, the advance sub-routine will consequently cause the carry to occur in a corresponding fashion relative to the frame desired. Thus, for an advance instruction from H1 to advance left 1, the advance sub-routine will cause the MOVER sub-routine to position the G16 frame relative to the reader optics, assuming a 42× magnification.

Additional sub-routines that are performed by the microprocessor program contained in PROM 106 are a limit switch detector "SWER" sub-routine and a diagnostic test "TEST" sub-routine. The SWER routine generally monitors the movement of the carriage assembly and if a limit switch is actuated during the movement thereof, the motion of the carriage assembly is suspended and a warning signal is initiated; unless the carriage assembly has been moving in response to an Index command and in which event the carriage would, after touching home, continue to the index position.

The Test sub-routine, on the other hand, is a diagnostic aid which can be employed either by the individual user and/or the manufacturer of the present microfiche transport system. Specifically, the test subroutine can occur only by turning the switch S36 off and impressing an appropriate pulse sequence on the T0 terminal of the microprocessor 104. Specifically, the sequence of events that one would employ in testing the present microfiche transport system would be to insert a test film into the microfiche holder 14 and step the transport system through a defined sequence of commands. The test film could then be monitored to determine if incorrect action took place. Further, this test sequence could be performed over numerous transport systems at the same time and thus facilitate the "burn-in" operation within a manufacturing facility. In the alternative, the test routine could be performed on a single unit, such as during field servicing.

While the present apparatus has been described with reference to the present preferred embodiment, it should be apparent to those of skill in the art, upon a reading of the present specification, that a number of other alternative embodiments may be obtained by employing the concepts presently taught. The present invention should, however, be interpreted within the spirit and scope of the following claims and be deemed to include all those alternative embodiments which are essentially equivalent to the present invention.

What is claimed is:

1. A microfiche transport system for controllably positioning a microfiche card relative to a magnifying lens system so as to read data contained upon individual frames affixed to said microfiche card, comprising:
   (a) a frame member including a slidable saddle movable along a first axis and a microfiche card holder slidably mounted upon said saddle and movable along a second axis;
   (b) first drive means for moving said saddle along said first axis;
   (c) second drive means for moving said microfiche card holder along said second axis;
   (d) keyboard means for directing the axial movement of a contained microfiche card relative to a magnifying lens system and selecting one of a plurality of frames contained thereon for viewing;
   (e) memory means for storing a plurality of preprogrammed variable duration drive signals;
   (f) control means responsive to said keyboard means for determining the magnitude and direction of directed movement along said first and second axes and for accessing said storage means and independently sequentially coupling a plurality of said drive signals to said first and second drive means, thereby controllably accelerating and decelerating said saddle and said microfiche holder during the positioning of a selected frame relative to said lens system.

2. A system as set forth in claim 1 wherein the order of selection of each of said drive signals is controlled relative to the duration of a previous drive signal such that a constant incremental distance is traversed by said carriage means along either of said first or second axes with each drive signal independent of the drive signal duration.

3. A microfiche transport system comprising:
   (a) a frame member;
   (b) a saddle slidably mounted on said frame member for motion along a first axis;
   (c) a microfiche holder slidably mounted upon said saddle for motion along a second axis orthogonal to said first axis;
   (d) first means for moving said saddle, including:
      (1) a first stepper motor affixed to said frame member, and
      (2) screw means coupled to said first stepper motor and rotatably mounted to said frame member and through said saddle for moving said saddle along said first axis;
   (e) second means for moving said microfiche holder, including:
      (1) a second stepper motor;
      (2) a plurality of pulleys affixed to said frame member, said saddle and said microfiche holder, and
      (3) a wire affixed to said base and looped about said plurality of pulleys and rotatably coupled to said second stepper motor for moving said microfiche holder along said axis;
   (f) keyboard means for operator directing the axial movement of said saddle and said microfiche holder relative to a magnifying lens system and one of a plurality of selectable magnification powers and to one of a selected plurality of microfiche formats;
   (g) memory means for storing a plurality of addressable sequences of drive signals of differing durations and wherein each drive signal is exponentially related to a previous drive signal;
   (h) processor means responsive to said keyboard means and a selected lens magnification and microfiche format for determining the direction and magnitude of each selected axial movement along each of said first and second axes and for accessing said memory means and independently coupling selected sequences of said drive signals, depending upon the respective magnitudes of selected axial movement and said selected lens magnification and microfiche format, to each of said first and second means so as to accelerate and decelerate said saddle and microfiche holder as they move between selected positions.

4. A transport system for controllably positioning a microfiche card comprising:
   (a) carriage means for supporting a microfiche card having a plurality of frames mounted thereon;
   (b) drive means coupled to said carriage means for independently moving said microfiche card along at least a first and a second axis;

(c) keyboard means for directing the movement of said microfiche card relative to a magnifying lens system from an initial position to the center of a selected destination frame;

(d) means for storing a plurality of sequences of drive signals of differing durations, wherein the duration of each drive signal is related to a previous signal by 1/X, wherein "X" is the duration of the previous signal; and (e) processing means for scanning said keyboard means, calculating the magnitude and direction of directed axial movements and accessing said storage means and selectively coupling axially dependent ones of said drive signal sequences to said drive means relative to the magnitudes of directed movement and thereby cause the smooth transition of said microfiche card along said first and second axes and positioning of the selected frame relative to said lens system.

5. A system as set forth in claim 4 wherein said processing means applies said decelerating drive signals for each axis only after a predetermined separation has been detected between said carriage means and a selected destination coordinate for each axis.

6. A transport system for controllably positioning a microfiche card having a plurality of frames mounted thereon comprising:

(a) carriage means for supporting said microfiche card and operative upon the initialization thereof to a predetermined first position;

(b) drive means coupled to said carriage means for independently moving said microfiche card along at least a first and a second axis;

(c) keyboard means for directing the movement of said microfiche card to center selected frames relative to a magnifying lens system;

(d) means of storing a plurality of sequences of drive signals of differing durations;

(e) processing means having a plurality of preprogrammed sub-routines for determining the absolute magnitude and direction of each directed movement along each of said axes upon detecting move commands and for accessing said storage means so as to independently couple ones of said sequences of drive signals to said drive means to controllably accelerate and decelerate said carriage means said decelerating drive signals being applied once said carriage means is of a predetermined separation from a selected destination coordinate along each of said first and second axes, thereby causing the smooth transition of said microfiche card along said first and second axes to the selected frame destination and the centering of a selected frame relative to the magnifying lens system.

7. A microfiche transport system for controllably positioning a microfiche card relative to a magnifying lens system so as to read data contained upon individual frames affixed to said microfiche card, comprising:

(a) a frame member including a slidable saddle movable along a first axis and a microfiche card holder slidably mounted upon said saddle and movable along a second axis;

(b) first drive means for moving said saddle along said first axis;

(c) second drive means for moving said microfiche card holder along said second axis;

(d) keyboard means for directing the axial movement of a contained microfiche card relative to a magnifying lens system by selecting one of a plurality of frames contained thereon for viewing;

(e) memory means for storing a plurality of addressable sequences of drive signals, each of said drive signal sequences providing for the application of a different total duration of drive power and consequent total magnitude of movement;

(f) control means responsive to said keyboard means for determining the magnitude and direction of each directed movement along said first and second axes and for each axis independently selecting and applying selected ones of said drive signal sequences to said first and second drive means so as to move a predetermined constant distance with each individual dirve signal and controllably accelerate and decelerate said frame member during the positioning of a selected microfiche frame relative to said lens system.

8. A transport system as set forth in claim 7 including means for initializing said carriage means to a predetermined initial position for each microfiche card and relative to which position said control means successively controls the subsequent operator directed movements of said carriage means.

9. A system as set forth in claim 7 wherein each of said drive signals is related to a previous drive signal by 1/X, wherein "X" is the duration of the previous drive signal.

10. A transport system as set forth in claim 7 including means for selecting one of a plurality of formats at which said frames may be affixed to said microfiche card and wherein the sequence of drive signals selected by said control means depends on the format selected.

11. A transport system as set forth in claim 7 including means for selecting one of a plurality of lens magnifications and wherein the sequence of drive signals selected by said control means depends on the magnification selected.

12. A transport system as set forth in claim 7 wherein one of said drive signal sequences for movements greater than a predetermined magnitude include one or more constant velocity drive signals intermediate a train of accelerating and decelerating drive signals.

* * * * *